Figure 3:
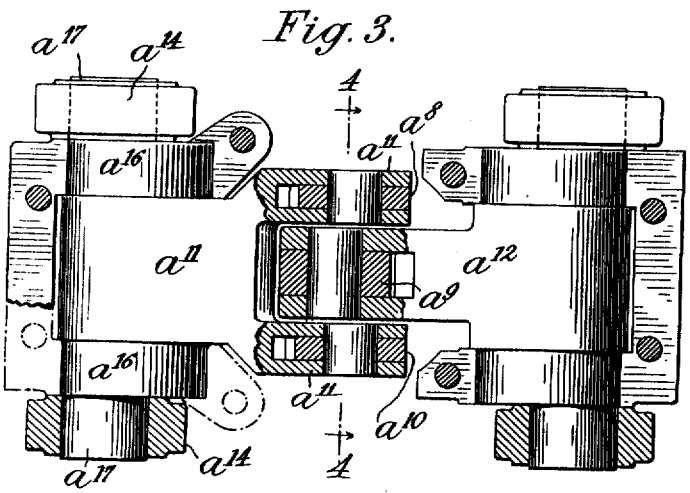

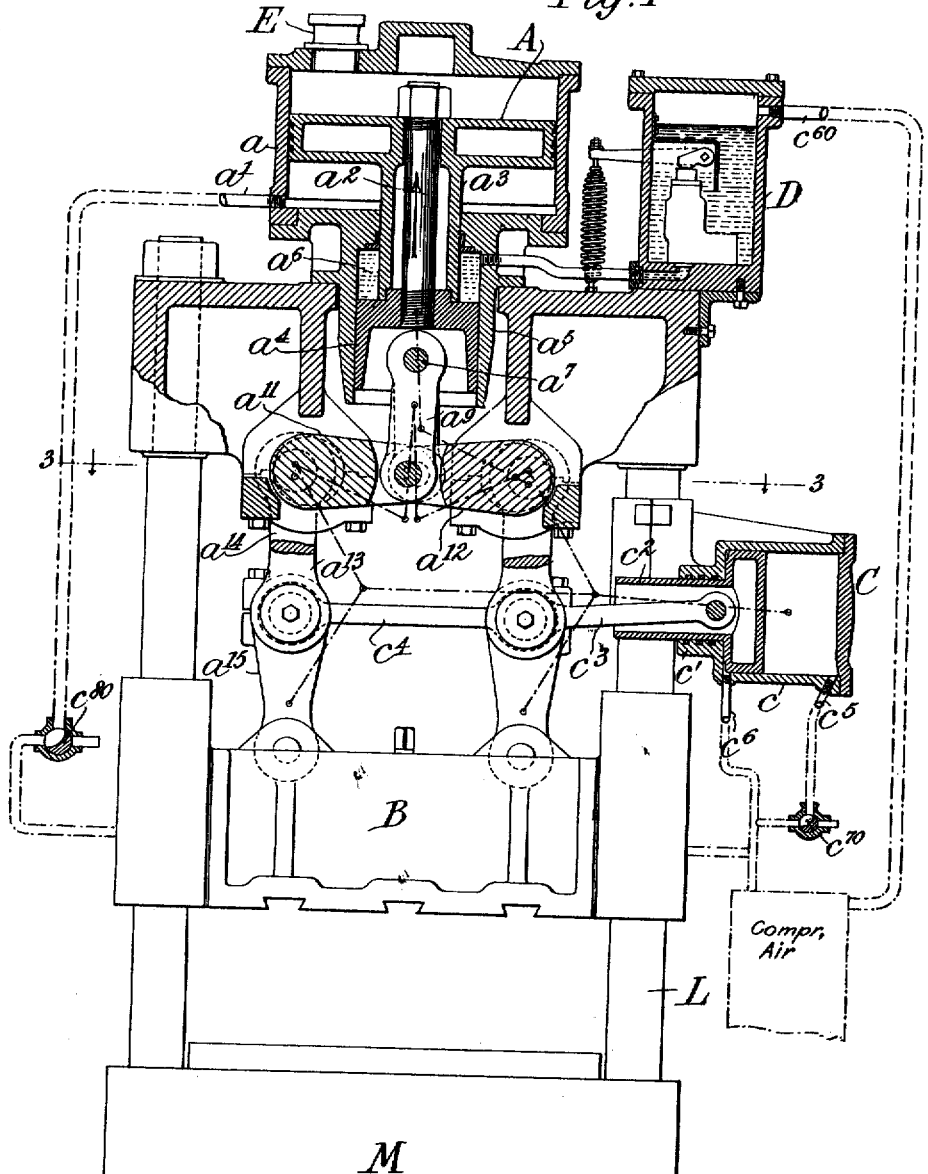

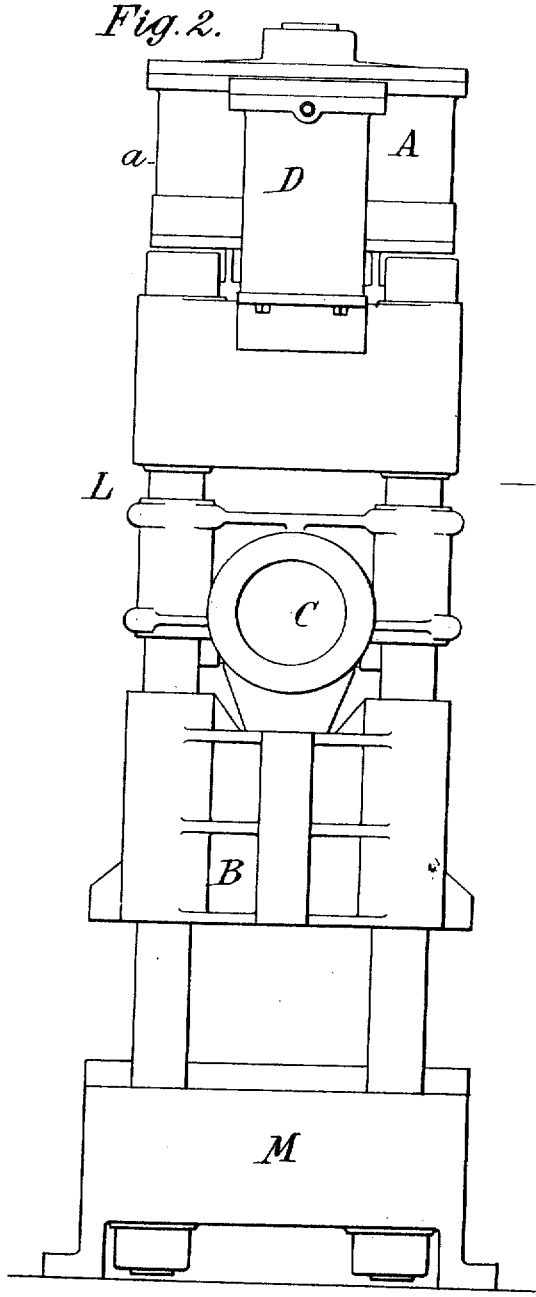
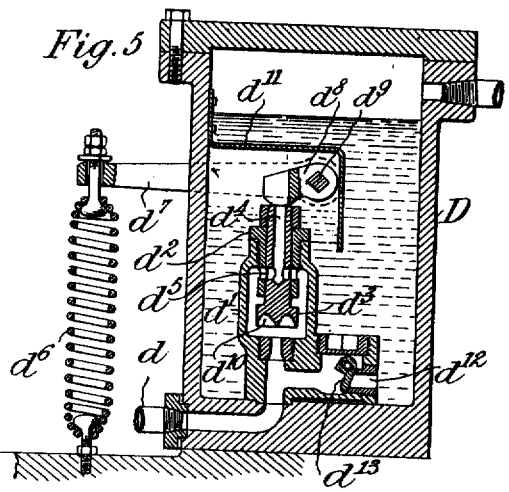
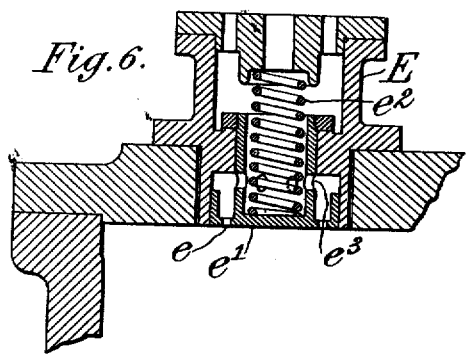

F. ORTON.
PRESS.
APPLICATION FILED OCT. 17, 1910.

1,007,792.

Patented Nov. 7, 1911.
6 SHEETS—SHEET 3.

WITNESSES:

INVENTOR:
Frederick Orton,
By Attorneys,

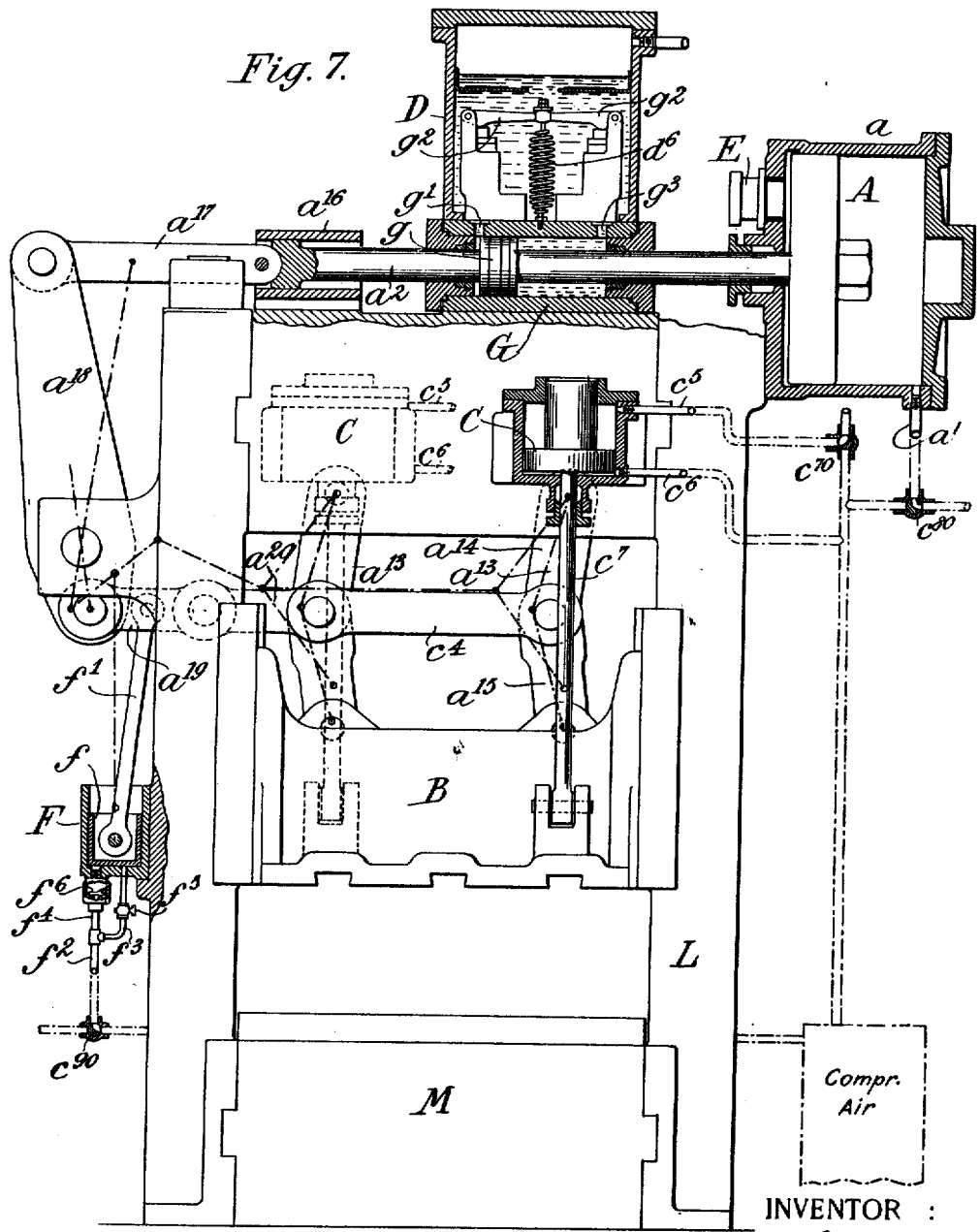

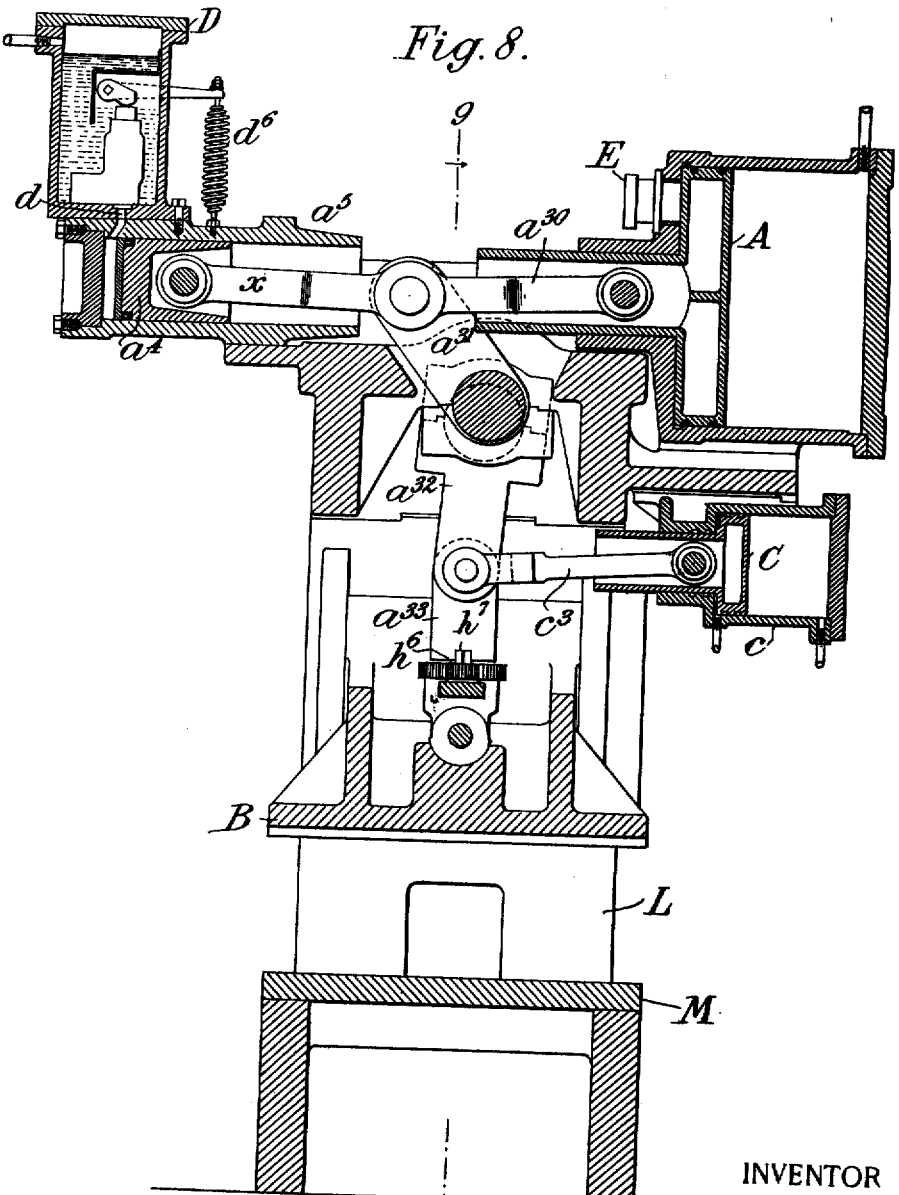

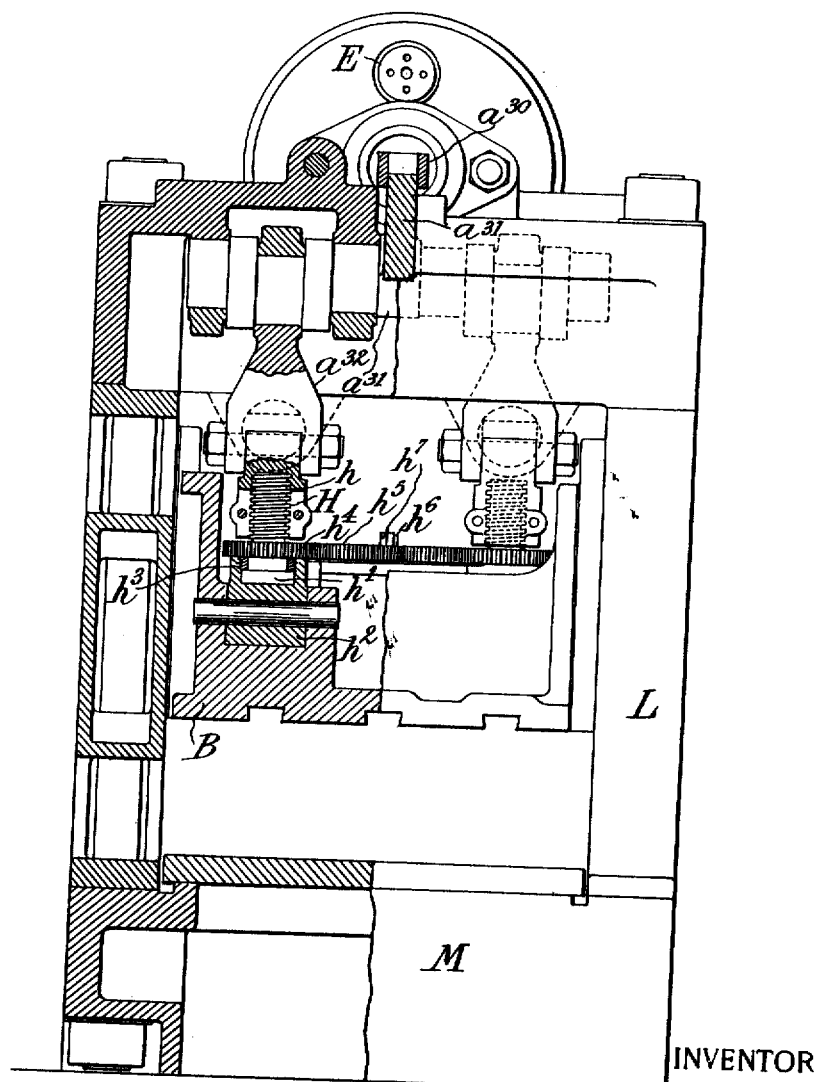

UNITED STATES PATENT OFFICE.

FREDERICK ORTON, OF NEW YORK, N. Y., ASSIGNOR TO E. W. BLISS COMPANY, OF BROOKLYN, NEW YORK, A CORPORATION OF WEST VIRGINIA.

PRESS.

1,007,792.   Specification of Letters Patent.   Patented Nov. 7, 1911.

Application filed October 17, 1910.  Serial No. 587,522.

*To all whom it may concern:*

Be it known that I, FREDERICK ORTON, a citizen of the United States, residing at Glendale, in the borough and county of Queens, city and State of New York, have invented certain new and useful Improvements in Presses, of which the following is a specification.

This invention relates to power presses such as are used for various metal working operations, such as punching, stamping, drawing or the like, which instead of being driven by mechanical power are operated by fluid pressure. For certain purposes and in certain locations it is more convenient or desirable to drive presses for such purposes by fluid pressure than by belting from a power shaft or by an electro-motor.

Hydraulic presses are desirable where extremely heavy work is required, but for ordinary purposes are too slow to be practical. There is a considerable field where it would be desirable to use compressed air or steam as the motive fluid; and the present invention is more particularly designed to provide an economical and efficient press to be operated by such fluids. In any such press the working or tool bearing part commonly requires to have a movement considerably in excess of that involved in its working stroke; that is to say, in order to give room for inserting and removing the blank or other work, or for other reasons, it requires a relatively long preparatory or preliminary movement in which the tool is either wholly idle or is doing very light work, followed by a relatively short final or working movement, in which last alone is any considerable power required. In a fluid actuated press it would be wasteful of fluid to employ for giving the entire stroke, a single piston having sufficient area to give the requisite pressure for the working part of the stroke. It is consequently desirable to provide two pistons, the one for effecting the preliminary portion of the stroke to bring the tool or working part or parts to the working position, and the other a piston of much larger power or working at much greater mechanical advantage, to complete the stroke, in order to give the increased power required to overcome the added resistance encountered in doing the actual work.

My invention aims to provide a practicable press wherein the operation is thus divided between two cylinders and pistons, the one of smaller area giving the preliminary stroke, and the one of larger area affording the final or working stroke.

One feature of improvement resides in such correlation of the preliminary or auxiliary piston with toggles or equivalent mechanical intermediaries as affords a rapid preliminary stroke which at its termination leaves the parts solidly reinforced against a strong resistant portion of the frame of the press, whereby the more powerful movement effected by the larger or main piston is brought to bear against an adequate abutment for receiving the reactive thrust of the working stroke.

Another feature of improvement resides in the employment of a single acting main piston and the provision of means for returning it to initial or starting position other than by the direct application of motive fluid to its non-working face, thereby economizing in motive fluid.

Thus my invention has for its objects to increase the economical operation of the press by reducing the amount of motive fluid required; to intensify or multiply the pressure applied to the main piston so as to obtain a lesser movement and a greater pressure upon the working tool.

A further object is to provide means whereby the operation of the machine is made safe, and in case of the breaking of a tool or the sudden release of the load resistance upon the main piston in any manner, the machine will not be broken but will gradually be brought to a stop. To attain this object I provide one or more fluid controlling devices in the nature of a hydrostatic brake adapted to check any excessive speed of either piston.

I have illustrated my invention as applied to a machine designed for use as a trimming press, and in the particular embodiments illustrated in the accompanying drawings a machine of large capacity is presented where an effective pressure upon the punches or other tools of at least 250 tons is available. In such machines the conditions are vitally different than in smaller machines, as should it happen that for any reason the load upon the piston is suddenly released, the tremendous power developed would tend to wreck the machine and possibly destroy the building in which it was erected, with possible loss of life. My machine as illustrated therefore is designed particularly with reference to the embodiment of the invention in large capacity machines, and contains features which although valuable in such a machine might be no less valuable in machines of smaller capacity or different type.

The foregoing objects, and other objects which will appear as the description proceeds, are attained by the use of the mechanical principles which I have illustrated as embodied in the several machines shown in the accompanying drawings, wherein—

Figure 4:
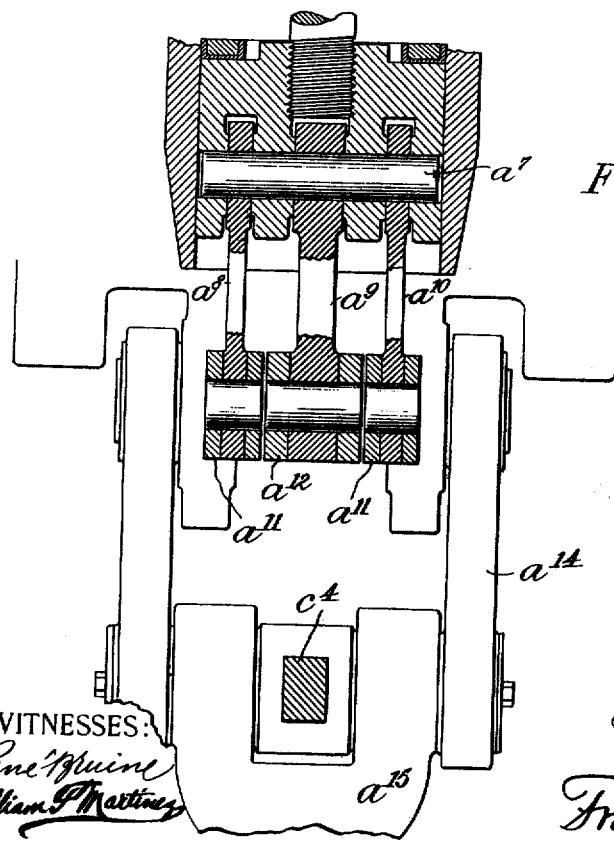

Figure 1 is a vertical section through a machine embodying my invention; Fig. 2 is a side view thereof taken from the right in Fig. 1; Fig. 3 is a transverse section on the line 3—3 of Fig. 1; Fig. 4 is a vertical section of a part of the machine on the line 4—4 of Fig. 3; Fig. 5 is a detail sectional view of a fluid regulating valve operating in connection with the main piston; Fig. 6 is a detail of a similar valve attached to the main cylinder; Fig. 7 is a view similar to Fig. 1 illustrating in elevation and partly in section a modified form of machine; Fig. 8 is a vertical section of a further modified form of machine; Fig. 9 is a section of the same machine illustrated in Fig. 8 taken on a plane at right angles to the plane of said figure, as shown by line 9—9.

All of the drawings show vertical presses having an upright main frame L and a fixed bed M with a vertically movable tool-carrying part B which is commonly and most conveniently constructed as a slide or sliding table moving in upright guideways. Conveniently mounted on the frame are the main cylinder $a$ containing the main or working piston A, and one or more auxiliary cylinders $c$ containing each a preliminary or auxiliary piston C. The pistons A and C connect through suitable power increasing devices in the nature of toggles, cranks, or eccentrics to the movable slide B, whereby the latter is lowered and retracted through the successive movements of the respective pistons.

In the preferred form of machine illustrated in Figs. 1 to 6 inclusive, the main piston A is contained within the main cylinder $a$ to which motive fluid is admitted through inlet port $a^1$ to the under side or working face of the main piston. The piston rod $a^2$ attached to the main piston is surrounded by an annular shell $a^3$ which is likewise attached to the main piston, and the said piston rod and shell at their lower ends are pinned or otherwise connected to a control piston $a^4$, which slides within a cylinder $a^5$ containing oil or other liquid, and within the upper part of which a liquid reservoir $a^6$ is formed, and as the main piston is moved up and down its rod $a^2$ is directed by the piston $a^4$ which acts as a guide for the said rod. Suitably secured to depending flanges upon the piston $a^4$, as by a rod $a^7$, are links $a^8$ $a^9$ and $a^{10}$, and these links are connected through pins to the inner ends of oppositely disposed crank arms $a^{11}$ $a^{12}$ having trunnions $a^{16}$ and crank portions or eccentrics $a^{17}$ which are received in the upper arms of toggle joints $a^{13}$ which are composed of upper and lower arms $a^{14}$ $a^{15}$ pivotally connected at their centers, and at their lower ends pivotally attached to the slide B. Two toggle joints are employed, for the reason that in a press of the size and character illustrated, particularly a trimming press, true register of the male and female dies is essential, and the employment of a plurality of toggles contributes thereto. The auxiliary cylinder $c$ is shown as located horizontally, and its forward part has a stuffing box $c^1$ within which moves the tubular trunk $c^2$ of the auxiliary piston C. Attached to the piston C as by being pivoted thereto, is a connecting rod $c^3$ by which, as well as pitman $c^4$, connection is made from the auxiliary piston to the knuckles of the toggle joints. The auxiliary piston, it will be perceived, is of much smaller dimensions than the main cylinder, and consequently requires a much smaller proportion of motive fluid for its operation. Compressed air or other motive fluid is admitted through supply pipe $c^5$, and where necessary through a similar pipe $c^6$ at the trunk end of the piston.

In Fig. 1 there is represented diagrammatically a compressed air tank from which the air is admitted through pipe $c^5$ to the working face of the cylinder for its forward or working stroke. During this stroke the compressed air will be expelled from the trunk face of the piston through pipe $c^6$, to said tank. Pipe $c^5$ is equipped with a valve $c^{70}$ which may be turned to exhaust into the atmosphere, whereupon the constant pressure upon the trunk face of the piston will return it to starting position. Any suitable compressed air supply may be employed.

The fluid controlling devices are to prevent excessive velocity of the motive piston, either before the dies come into action or after their action ceases, or during the action of the dies on operations the resistance of which is inconstant, and said devices are also employed to prevent accidents. One of such devices is illustrated as being connected to the fluid chamber $a^6$, and this is designated D. Preferably oil is maintained within the fluid chamber $a^6$, and during the upward or working stroke of the main piston A its attached piston $a^4$ expels the oil within the fluid chamber through a pipe $d$ to the bottom of the fluid controlling device D, which is suitably supported upon the frame. This device is illustrated in detail in Fig. 5, and as illustrated it comprises a valve casing $d^1$ which is perforated at its lower part to admit the oil from pipe $d$, and at its upper part has a threaded lining $d^2$ within which reciprocates a throttle valve $d^3$ having a central bore $d^4$ and connecting ports $d^5$ which normally are alined with the oil passage in the casing. The throttle valve $d^3$ is spring pressed downwardly by a spring $d^6$ suitably attached to the frame and exerting a downward pressure upon the throttle valve through arms $d^7$ $d^8$ supported at $d^9$.

The lower part of the throttle valve $d^3$ is provided with a circular groove $d^{10}$ in position to receive the oil injected through the pipe $d$. If the oil comes at the accustomed velocity which it acquires when the main piston is performing its work, the throttle valve $d^3$ will not be affected thereby, but a decrease in the load resistance to the movement of the main piston will increase the velocity of oil, and consequently tend to move the throttle valve upward against the resistance of the spring and close the outlet openings $d^5$ for the oil. Suitable devices, such as a baffle plate $d^{11}$, may be employed if desired to prevent foaming of the oil. The oil is permitted to return to the valve chamber through a port $d^{12}$ normally closed during the injection of the oil by a check-valve $d^{13}$, but which readily opens to permit the ejection of the oil. Compressed air at constant pressure is maintained within the casing of the oil regulating device D above the oil, being admitted through pipe $c^{60}$ for the purpose of assisting in restoring the main piston to its initial or starting position, especially where the weight of the main piston is not made sufficient for its gravity alone to so restore it.

The air cushion device E which is illustrated as being applied directly to the main cylinder and at the upper part thereof, may be provided as a safety device, and as an auxiliary to the oil controlling device D, and in case the said device fails to work for any cause. The said air cushion valve is applied to the non-working end of the cylinder and is operated preferably by atmospheric air, and this device tends to overcome unusual acceleration of motion of the main piston and to bring the piston softly to rest. Said air cushion valve as illustrated comprises an exhaust port $e$ in the non-working end of the cylinder, within which is seated a throttle valve $e^1$ under the control of a coiled spring $e^2$. The ports $e^3$ in the said throttle valve are normally in line with exhaust port $e$, and the spring is adjusted so that during the normal movement of the air through the exhaust port the throttle valve will not be affected, but if for any reason the motion of the main piston is accelerated, or the pressure upon the non-working end thereof is increased, the throttle valve $e^1$ will be depressed, gradually closing the exhaust port $e^3$, and this increases until the throttle valve is depressed sufficiently to entirely close the exhaust, whereupon the main piston will be brought easily and softly to rest. The operation of this form of my device is as follows:—In the starting position the main piston A will be at the lower part of the cylinder $a$, and the auxiliary piston C will be at the right hand end of its cylinder. In this position the toggles will be bent to the right. It is desired for purposes of economy that as little compressed air as is actually required shall be employed in the operation of the machine, and in order to effect this, I make the auxiliary cylinder $c$, which is only employed to move the tools during their idle movement, of much smaller dimensions than the main cylinder which controls the tools during their working movement. Compressed air being admitted to the rear or working face of the auxiliary piston C through pipe $c^5$, it is driven forward, straightening out the toggles until they assume a substantially vertical position, as illustrated in full lines in Fig. 1, in which position the punches or other tools have been moved to working position, and in this position the toggles are held by the auxiliary cylinder during their subsequent work. The air is not exhausted from the non-working or trunk face of the auxiliary cylinder during this forward motion of its piston, but is expelled therefrom by the compressed air admitted to the working face thereof, which acts upon a larger area assisted by the weight of the slide B acting through the toggles. During this operation the main piston A has been at rest. Valve $c^{80}$ is then turned to admit compressed air or other motive fluid to the lower or working face of the piston A through pipe $a'$, forcing said piston upward and expelling oil or other fluid medium from the fluid chamber $a^6$. I prefer to employ oil in this cylinder owing to its superior advantages for the purpose. The oil flows through the pipe $d$ into the oil controlling device D, in which it is projected against the throttle valve $d^3$, and if its motion is not unduly accelerated, emerges through the ports into the casing of the said device and expels part of the air at the upper part thereof. Simultaneously the air is expelled from the non-working end of the main cylinder through controlling device E in the manner described. The said motion of the main piston A lifts the links $a^8$ $a^9$ $a^{10}$ and turns the cranks $a^{17}$ connected to the crank arms $a^{11}$ $a^{12}$, thereby forcing the toggles $a^{13}$ downward and pressing the punches, dies or other tools to their work. The extent of working motion required of the tools is not great, consequently the eccentricity of the cranks is not extensive, and the increase in power applied to the working face of the main piston is very great.

An important point in my invention is the saving of power not only in that required to bring the tools to their working position, but principally in that required to return the main piston to its initial or starting position. This piston I term a single acting piston, as it has only one working face, the lower face. The motive fluid is not applied directly to the upper or non-working face of the said cylinder for its return, and thereby I accomplish a further considerable saving. Owing to the necessarily large area of the said main piston, a great amount of compressed air would be necessary if applied directly thereto to return the same to its initial or starting position. This return may be accomplished in several ways. In the particular form in which the machine is illustrated in Fig. 1, the return of the said main piston is accomplished partly by gravity through the weight of said piston assisting in overcoming the weight of the slide B. Also through the compressed air upon the surface of the oil within the oil controlling device D which is exerted upon the face of the fluid cylinder $a^6$, as well as by the compressed air in the auxiliary cylinder $c$, the pressure of which is exerted upon the non-working or trunk face of the auxiliary piston C. It will therefore be perceived that the said main piston A will return to its starting position by simply exhausting the air from the main cylinder, which may be done through the inlet pipe $a^1$ by opening valve $c^{80}$ to exhaust into the atmosphere or other exhaust port, and from the auxiliary cylinder $c$, which may also be accomplished through the inlet pipe $c^5$, by exhausting through valve $c^{70}$, whereupon the main piston will automatically return to its starting position.

In the modified form illustrated in Fig. 7, the main piston A is disposed horizontally, and the auxiliary pistons C, of which there are two, are here illustrated as disposed vertically. The main piston rod $a^2$ is guided in a tubular guide $a^{16}$, and is connected by a link $a^{17}$ to a rocking lever $a^{18}$ which is pivotally mounted upon the frame and at its lower end is connected to one arm $a^{19}$ of a horizontally arranged toggle joint, the other arm $a^{20}$ of which is connected to the pivots of the toggles $a^{13}$. In this form the upper arms $a^{14}$ of the toggles are not connected to the auxiliary cylinders, but are pivoted to the frame of the machine. The piston rods $c^7$ of the auxiliary pistons are directly connected to the slide B to which the arms $a^{15}$ of the toggles are pivotally connected. In this form of my machine I preferably employ a dash pot F for the purpose of breaking the toggle $a^{19}$ $a^{20}$. This dash pot has a vertically reciprocating piston $f$ connected by a piston $f^1$ to the arm $a^{19}$. Compressed air is applied to the lower or working face of the piston $f$ through pipe $f^2$. The air control E for the main piston A is the same as that illustrated and described in connection with Fig. 1. The oil control is likewise substantially the same. It is however double acting and comprises a fluid cylinder G within which reciprocates a piston $g$ fixed to the main piston rod $a^2$. During the forward or working stroke of the main piston, the oil is forced through the port $g^1$ and encounters a throttle valve of the same construction as the valve $d^3$, (Fig. 5) and against the resistance of a spring $d^6$ connected to two levers $g^2$ which bear upon the upper ends of two of the said throttle valves $d^3$. The second throttle valve $d^3$ is for the purpose of controlling the return passage of the main piston A, which it does by regulating the passage of oil which is forced through port $g^3$ by the return movement of the fluid piston $g$, while at the same time the oil in the apparatus is permitted to freely pass to the opposite face of the fluid piston through ports and check-valves similar to $d^{12}$ $d^{13}$.

In Fig. 7 the machine is illustrated with the slide in its lowermost position. The return of said slide and of the main piston A to its initial or starting position, is accomplished as follows:—Compressed air is exhausted from the upper faces of the auxiliary pistons C, through pipe $c^5$ by turning two-way valve $c^{70}$ and from the main piston through pipe $a^1$ by opening two-way valve $c^{80}$, and compressed air flows to the lower faces of the auxiliary pistons through air inlet $c^6$ which is always in communication with the compressed air supply, whereupon the said pistons will rise, lifting the slide B and bending the toggles $a^{13}$, and moving the main piston A to its initial or starting position. At this time compressed air is admitted through pipe $f^2$ and branches $f^3$ and $f^4$ to the dash pot F, breaking the toggle $a^{19}$ and permitting the auxiliary cylinders to bend the toggles $a^{13}$ and $a^{19}$ $a^{20}$. The device is then ready for operation. Air is admitted to the auxiliary cylinders through compressed air pipes $c^5$, the weight of the slide and the pressure of air upon the trunk end of the piston overcoming the pressure of air upon the lower part of the piston, lowering the slide B and straightening out the toggle $a^{19}$ $a^{20}$. The descent of this toggle, which is very heavy, is eased by the dash pot F, and the air in the said dash pot is permitted to escape gradually through pipe $f^3$ which is provided with a suitable valve $f^5$ for restricting the flow, and is discharged to the atmosphere by turning two-way valve $c^{90}$ in pipe $f^2$. Branch $f^4$ has a chamber equipped with a check-valve $f^6$ which prevents the passage of air during the descent of the piston $f$ through said branch $f^4$. When these operations have taken place, toggle $a^{19}$ $a^{20}$ and links $c^4$ will be in line, and the slide B will have brought the working tools down to the work. This is all accomplished with a very slight expenditure of motive fluid, far less than would have been necessary if the main piston A took part in such work. Air is then admitted to the rear or working face of the main piston A through pipe $a^1$, valve $c^{30}$ having been turned to connect said pipe with the compressed air supply, whereby lever $a^{18}$ is rocked and toggles $a^{19}$ $a^{20}$ and link $c^4$ are moved to the right, straightening the toggles $a^{13}$ and causing the tools to perform their work. The operation of the oil control device G and the air control E is the same as that heretofore described, with the exception that the return movement of the main piston A is also cushioned and checked by the oil control G.

In the modified form illustrated in Figs. 8 and 9, the main cylinder A has pivotally connected thereto a link $a^{30}$ to which is pivotally connected a crank arm $a^{31}$ the crank of which is connected to the arm $a^{32}$ of a toggle, the lower arm of which $a^{33}$ is pivotally connected to the slide B; the auxiliary piston C, of which in this instance two are employed, one for each toggle, being connected with the knuckle of the toggle by a link $c^3$. The fluid control chamber for the main piston is substantially the same in construction as that illustrated in Fig. 1, and comprises a fluid cylinder $a^5$, a fluid piston $a^4$ connected by a link $x$ to the main piston rod $a^{30}$, an oil duct $d$, and throttle valve, etc., for regulating and checking the flow of the oil as in Fig. 5. The air control E is placed upon the main cylinder as in Fig. 6. In this form of my invention compressed air is maintained upon the surface of the oil in the oil device D as in the previous form, both for the purpose of facilitating the return of said oil to the fluid chamber, as well as for the purpose of assisting the return of the main piston A to its initial or starting position. Here also the air within the auxiliary cylinder $c$ is not exhausted upon the forward stroke of the auxiliary piston, but is expelled therefrom and returned to the compressed air tank, whereby the return of the auxiliary piston is facilitated and the lifting of the table and breaking of the toggles is accomplished. In this form I have also illustrated devices for adjusting the position of the slide B relative to the bed. This is accomplished by threaded posts H which are received in a threaded socket $h$ formed in an upper member of each of the toggle arms $a^{33}$. These posts have integral collars $h^1$ which are received in recesses in a lower member $h^2$ of said arm and held there by collars $h^3$ which are threaded into recesses in said lower member and engage the flanged head of the threaded post H. Fixedly attached to said threaded posts H are gears $h^4$ which are connected by intermediate gears $h^5$ with a center pinion $h^6$ having means for adjusting the same, as a squared spindle $h^7$ (Fig. 8), by means whereof as the pinion $h^6$ is turned the threaded posts H are likewise turned, causing the members $a^{33}$, $h^2$, to approach or recede from each other, and enabling the slide B to be adjusted. The lower members $h^2$ are pivotally attached to the slide. In operation in this form of my device, the slide B having been adjusted to the proper height and the pistons A, C being at their rearward positions, compressed air will be admitted to the auxiliary cylinder $c$, forcing the auxiliary piston C forward and expelling the air at the trunk face thereof, and straightening the toggles $a^{32}$ $a^{33}$ and lowering the slide B to the work. Compressed air will then be admitted to the main cylinder, forcing the main piston A forward, where its motion is suitably controlled by the oil and air controlling devices D E. The toggles $a^{32}$ $a^{33}$ are then in a straight line, and the crank connected to crank arm $a^{31}$ will be rotated, causing the working movement of the tools. The return movement is accomplished as in Fig. 1.

It is not to be inferred by reason of the particularity with which I have described the details of my improved machine, that such details are essential, as the invention may be embodied in a great variety of constructions which would suggest themselves to any skilled mechanic.

I do not regard the invention as necessarily limited in its employment to the double crank presses illustrated, as it is obvious that it may equally well be employed in a single crank press or in multiple crank presses employing more than two cranks, and in many different kinds of presses whether used for trimming, blanking, stamping, punching, riveting, embossing, forming, drawing or other purposes wherein the moving member has a stroke consisting of working and non-working periods, and while I have illustrated a press wherein the moving member is vertically moved, it will be obvious that it may equally well be horizontally or angularly moved. The number of active cylinders may be increased or diminished according to the requirements of the particular machine to which the invention is applied. Should the machine require such power that the motive cylinder would have to be of unusually large proportions, a plurality of such cylinders could be employed without requiring a change in the principle of construction, and the auxiliary cylinder illustrated may likewise be in one or more units acting simultaneously.

I claim as my invention:—

1. In a power press, a movable member, means for imparting to said movable member a preliminary movement in such press to present the work, and independently operated means for imparting a final movement to said movable member to perform the work, and a single-acting piston for executing such final movement.

2. In a power press, means for imparting to its movable member its preliminary movement, and means independent of such last-mentioned means, comprising a single-acting piston for imparting thereto its final or working movement.

3. In a fluid operated power press, the combination with the movable member of the press, of an auxiliary piston actuated by expansible fluid and connected to said member to impart the preliminary movement thereto, and a single-acting main piston connected to said member for effecting its final or working movement.

4. In a fluid operated power press, the combination with the movable member of the press, of an auxiliary piston connected to said member to impart the preliminary movement thereto, a main piston connected to said member for effecting its final or working movement, and controlling means for preventing acceleration of said main piston.

5. In a fluid operated power press, the combination with the movable member of the press, of an auxiliary piston connected to said member to impart the preliminary movement thereto, a main piston connected to said member for effecting its final or working movement, and hydraulic controlling means for preventing acceleration of said main piston.

6. In a fluid operated power press, the combination with the frame and the movable member of the press, of an auxiliary and a main piston, and intermediate mechanical connections for communicating the successive movements of both said pistons to said member, said mechanical connections reacting against said frame, whereby the resistance to said member during its working movement is communicated through said connections to the frame of the press.

7. In a fluid operated power press, the combination with the movable member of the press, of an auxiliary piston and an independently operated main piston connected to impart successive movements to said member, and means for returning said main piston to its starting position upon the cessation of the fluid pressure thereon.

8. In a fluid operated power press, the combination with the movable member of the press, of an auxiliary and a main piston connected to impart successive movements to said member, and a controlling device for said main piston comprising a hydraulic cylinder moving therein connected to the main piston, and means for controlling the flow of liquid in said cylinder.

9. In a fluid operated power press, the combination with the movable member of the press, of an auxiliary and a main piston connected to impart successive movements to said member, and a controlling device for said main piston comprising a hydraulic cylinder moving therein connected to the main piston, and means for controlling the flow of liquid in said cylinder comprising a throttle valve adapted to be moved by an increased rate of flow and to restrict the fluid passage.

10. In a fluid operated power press, the combination with the movable member of the press, of an auxiliary and a main piston connected to impart successive movements to said member, and means for controlling the movement of said main piston adapted to decrease the flow of fluid as the speed of said piston increases.

11. In a fluid operated power press, the combination with the movable member of the press, of an auxiliary and a main piston connected to impart successive movements to said member, and means for controlling the movements of said main piston comprising a spring pressed throttle valve responding to variations in fluid pressure and adapted to retard the flow of fluid as the pressure increases.

12. In a fluid operated power press, the combination with the movable member of the press, of an auxiliary and a main piston connected to impart successive movements to said member, and means for controlling the movements of said main piston comprising a main controlling device therefor, and an independent auxiliary controlling device.

13. In a power press, the combination of the movable member thereof, toggles connecting therewith, an auxiliary piston for imparting a straightening movement to said toggles to give the preliminary movement to said member, and a main piston acting through said toggles to impart the final or working movement to said member.

14. In a power press, the combination of the movable member thereof, toggles connecting therewith, an auxiliary piston for imparting a straightening movement to said toggles to give the preliminary movement to said member, and a main piston connected to exert a thrust through said straightened toggles for imparting the final or working movement to said member.

15. In a power press, the combination with its movable member of a toggle, a main piston, a power increasing connection between said piston and toggle, and an auxiliary piston connected to straighten said toggle.

16. In a power press, the combination with its movable member of a toggle, an auxiliary piston connected to straighten said toggle, a main piston, and a crank connection between said main piston and toggle.

17. In a power press, the combination with its movable member of a single acting main piston adapted to move said member during its working movement, an auxiliary piston of smaller area adapted to move said member during its idle movements, and connections whereby the auxiliary piston assists the return of the main piston.

18. In a power press, a movable member, a single acting main piston having a normal retractile tendency and a double acting auxiliary piston, both connected to said member, whereby upon relieving the main piston of fluid pressure it automatically performs its return movement.

19. In a power press, a movable member, toggle mechanism connected thereto, an auxiliary piston for moving said movable member during its idle movement, a single acting main piston for moving said movable member during its working movement, and means independent of the motive fluid control upon said main piston for returning it to starting position.

20. In a power press, a movable member, an auxiliary piston adapted to move said movable member during its idle movement, a single acting main piston adapted to move said movable member in its working movement, and power increasing devices located between said main piston and said movable member.

21. In a power press, a movable member, an auxiliary piston adapted to move said movable member during its idle movement, a single acting main piston adapted to move said movable member in its working movement, power increasing devices located between said main piston and said movable member, and means independent of the motive fluid control upon said main piston for returning it to starting position.

22. In a power press, a movable member, an auxiliary piston adapted to move said movable member during its idle movement, a single acting main piston adapted to move said movable member in its working movement, power increasing devices located between said main piston and said movable member, and a controlling device for said main piston.

23. In combination, a movable member, an auxiliary piston adapted to move said movable member during its idle travel, and a single acting main piston adapted to move said movable member during its working travel, and means independent of the motive fluid control upon said main piston to return it to starting position.

24. In a power press, a movable member, an auxiliary piston adapted to move said movable member during its idle travel and a main piston adapted to move said movable member during its working travel, and a controlling device for said main piston comprising a fluid cylinder, a fluid piston connected to said main piston to move therewith and means connected with said fluid cylinder to control the flow of fluid.

25. In a power press, a movable member, an auxiliary piston adapted to move said movable member during its idle travel and a main piston adapted to move said movable member during its working travel, and a controlling device for said main piston comprising a fluid cylinder, a fluid piston connected to said main piston to move therewith, and means connected with said fluid cylinder to control the flow of fluid comprising a fluid passage leading from said fluid chamber, a throttle valve therein adapted to be moved by an increased rate of flow of said fluid and to restrict the fluid passage.

26. In a power press, a movable member and means for moving the same in said press including an auxiliary piston and a single acting main piston, together with a controlling device for said main piston, and an auxiliary controlling device independent of said first mentioned controlling device.

27. In a power press, a movable member, an auxiliary piston adapted to move said movable member in said press during its idle travel and a main piston adapted to move said movable member during its working travel, a controlling device for said main piston comprising a fluid chamber and means for controlling the flow of fluid, and an auxiliary controlling device independent of said first mentioned controlling device.

28. In a power press, a movable member, an auxiliary piston adapted to move said movable member during its idle travel, a single acting piston adapted to move said movable member during its working travel, a fluid controlling device for said main piston comprising a movable valve controlling the exhaust from the non-working end of the main cylinder adapted as the fluid pressure increases to restrict the outlet and gradually close the same.

29. In a power press, a movable member, an auxiliary piston adapted to move said movable member during its idle travel, a main single acting piston adapted to move said movable member during its working travel, a fluid controlling device for said main piston comprising a movable valve controlling the exhaust from the non-working end of the main cylinder adapted as the fluid pressure increases to restrict the outlet and gradually close the same, and means independent of the motive fluid control upon said main piston for returning it to starting position.

30. In combination, a single acting main piston, a fluid regulating device operatively disposed with relation thereto to retard the motion thereof upon decrease of load resistance, a moving part, a power increasing connection between said moving part and said main piston, an auxiliary piston, and connections therefrom to said moving part.

31. In combination, a vertically arranged single acting main piston, a fluid regulating device operatively disposed with relation thereto, to retard the motion thereof upon decrease of load resistance, a moving part, a power increasing connection between said moving part and said main piston, an auxiliary piston and connections therefrom to said moving part, whereby said auxiliary piston is adapted to control said moving part during its idle period and said main piston during its working period.

32. In a power press, a single acting piston, a fluid control piston connected therewith, a fluid chamber, means for maintaining the fluid therein under pressure whereby said fluid acts to return the main piston to starting position, and a device for regulating the flow of fluid connected with said chamber.

33. In a power press, a single acting piston, a fluid control piston connected therewith, a fluid chamber, means for maintaining the fluid therein under pressure whereby said fluid acts to return the main piston to starting position, and a device for regulating the flow of fluid connected with said chamber, a toggle joint, a power increasing connection between said main piston and said toggle, and an auxiliary piston connected to said toggle.

34. In combination, a vertically arranged single acting main piston, a toggle joint, a power increasing connection between said main piston and said toggle, and an auxiliary piston connected to said toggle.

35. In combination, a vertically arranged single acting main piston, a fluid regulating device operatively disposed with relation thereto, to retard the motion thereof upon decrease of load resistance, a moving part, a power increasing connection between said moving part and said main piston, an auxiliary piston and connections therefrom to said moving part, whereby said auxiliary piston is adapted to control said moving part during its idle period and said main piston during its working period.

36. In combination, a vertically arranged single acting main piston, a fluid regulating device operatively disposed with relation thereto, to retard the motion thereof upon decrease of load resistance, a moving part, a power increasing connection between said moving part and said main piston, an auxiliary piston and connections therefrom to said moving part, whereby said auxiliary piston is adapted to control said moving part during its idle period and said main piston during its working period, a connection for admitting motive fluid to the lower face of said main piston, whereby said piston works on its up-stroke and descends freely.

37. In combination, a single acting main piston, a fluid piston connected thereto, a fluid chamber receiving said fluid piston and acting as a guide for the main piston, a regulating device operatively connected with said fluid chamber and serving to retard and gradually stop the movement of the main piston as the load resistance decreases.

38. In combination, a single acting main piston, a fluid piston connected thereto, a fluid chamber receiving said fluid piston and acting as a guide for the main piston, a regulating device operatively connected with said fluid chamber and serving to retard and gradually stop the movement of the main piston as the load resistance decreases, a moving part, a power increasing connection between said moving part and said main piston, and an auxiliary piston connected to said moving part.

39. In combination, a single acting main piston, a fluid piston connected thereto, a fluid chamber receiving said fluid piston and acting as a guide for the main piston, a regulating device operatively connected with said fluid chamber and serving to retard and gradually stop the movement of the main piston as the load resistance decreases, a movable tool, a toggle joint connected thereto, a power increasing connection between said main piston and said toggle joint, an auxiliary piston and a connection therefrom to said toggle joint.

40. In a press, a movable tool, a vertically arranged single acting main piston, a toggle connected to said tool, a power increasing connection between said piston and said toggle, a horizontally arranged auxiliary piston, and a connection therefrom to said toggle.

41. In a press, a movable tool, a vertically arranged single acting main piston, a toggle connected to said tool, a power increasing connection between said piston and said toggle, a horizontally arranged auxiliary piston, a connection therefrom to said toggle, and a fluid regulating device operatively connected to said main piston.

42. In a press, a movable tool, a vertically arranged single acting main piston, a toggle connected to said tool, a power increasing connection between said piston and said toggle, a horizontally arranged auxiliary piston, a connection therefrom to said toggle, and a fluid regulating device connected to the non-working end of the main cylinder, comprising a spring pressed throttle valve adapted to permit the passage of fluid at the normal rate of flow when the main piston is working under load, and constructed to reduce and gradually stop the flow of fluid when the piston is free from load.

43. In a press, a movable tool, a vertically arranged single acting main piston, a toggle connected to said tool, a power increasing connection between said piston and said toggle, a horizontally arranged auxiliary piston, a connection therefrom to said toggle, and a piston-controlling device comprising a fluid piston on the main piston rod, a fluid cylinder surrounding and guiding said fluid piston and forming a fluid chamber above same, a connection from said fluid chamber to a valve chamber, a sliding spring controlled throttle valve therein in the flow of the fluid having a port normally in line with a corresponding port in the valve casing, and adapted to be moved by an increased pressure of fluid to reduce and gradually close the fluid ports.

44. In a press, a movable tool, a vertically arranged single acting main piston, a toggle connected to said tool, a power increasing connection between said piston and said toggle, a horizontally arranged auxiliary piston and a connection therefrom to said toggle, and a device for controlling the main piston comprising an exhaust port in the cylinder, a spring actuated throttle valve, having a port normally open and alined with the exhaust port, and adapted when the fluid pressure in the main cylinder increases to constrict and gradually close the exhaust.

45. In a press, a movable tool, a vertically arranged single acting main piston, a toggle connected to said tool, a crank connection between said toggle and said main piston, an auxiliary piston of less dimensions than the main piston, and a connection between said auxiliary piston and the toggle.

46. In a press, a movable tool, a vertically arranged single acting main piston, a toggle connected to said tool, a crank connection between said toggle and said main piston, an auxiliary piston of less dimensions than the main piston, a connection between said auxiliary piston and the toggle, a fluid piston connected to the main piston rod, a fluid cylinder surrounding and guiding said fluid piston and forming a fluid chamber above said piston, and a valve operatively connected to said fluid chamber and adapted to regulate the flow of fluid therefrom.

47. In a press, a movable tool, a vertically arranged single acting main piston, a toggle connected to said tool, a crank connection between said toggle and said main piston, an auxiliary piston of less dimensions than the main piston, and a connection between said auxiliary piston and the toggle.

48. In a press, a movable tool, a vertically arranged single acting main piston, a toggle connected to said tool, a crank connection between said toggle and said main piston, an auxiliary piston of less dimensions than the main piston, a connection between said auxiliary piston and the toggle, the said main piston constructed to rise during its effective stroke and to descend by gravity.

49. In a double crank press, a movable tool holder, a single acting vertically disposed main piston, a plurality of parallel toggles connected to said tool holder, a plurality of oppositely disposed crank arms connected to said toggles, and links connecting the arms on each side to the main piston rod, an auxiliary piston of smaller dimensions than said main piston, and connections therefrom to each of said toggles.

50. In a double crank press, a movable tool holder, a single acting vertically disposed main piston, a plurality of oppositely disposed crank arms connected to said toggles, and links connecting the arms on each side to the main piston rod, an auxiliary piston of smaller dimensions than said main piston, and connections therefrom to each of said toggles, and fluid regulating devices adapted to control the speed of said main piston.

In witness whereof, I have hereunto signed my name in the presence of two subscribing witnesses.

FREDERICK ORTON.

Witnesses:
FRED WHITE,
HENRY M. LOUB.

Copies of this patent may be obtained for five cents each, by addressing the "Commissioner of Patents, Washington, D. C."